United States Patent [19]

Johnston

[11] Patent Number: 4,470,595
[45] Date of Patent: Sep. 11, 1984

[54] HI-JACK

[76] Inventor: David F. Johnston, P.O. Box 15377, Riyadh, Saudi Arabia

[21] Appl. No.: 339,732

[22] Filed: Jan. 15, 1982

[51] Int. Cl.³ .............................................. B25J 1/00
[52] U.S. Cl. .................................. 272/100; 294/19 R
[58] Field of Search ............................... 272/100–104, 272/110; 294/19 R, 19 A; 248/539, 544, 353; 403/354, 191, 190, 234, 235; 273/129 L

[56] References Cited

U.S. PATENT DOCUMENTS

| | | | |
|---|---|---|---|
| 970,831 | 9/1910 | Johnson | 294/19 R |
| 1,895,393 | 1/1933 | Isbell | 273/129 L |
| 2,546,157 | 3/1951 | Hume | 248/353 |
| 2,560,109 | 7/1951 | Hines | 248/353 P |
| 2,640,236 | 6/1953 | Hume | 248/544 |
| 2,739,331 | 3/1956 | Goodman | 273/162 F |
| 3,342,489 | 9/1967 | Waldo | 273/129 L |
| 3,749,344 | 7/1973 | Racina | 272/101 |
| 3,952,463 | 4/1976 | Lane | 135/15 PQ |
| 4,089,553 | 5/1978 | Frykholm | 272/100 |

FOREIGN PATENT DOCUMENTS

| | | | |
|---|---|---|---|
| 617389 | 2/1949 | United Kingdom | 248/353 |
| 730479 | 5/1955 | United Kingdom | 248/353 |
| 776869 | 6/1957 | United Kingdom | 248/353 |

Primary Examiner—Richard J. Apley
Assistant Examiner—S. R. Crow
Attorney, Agent, or Firm—Cushman, Darby & Cushman

[57] ABSTRACT

A compact, lightweight, portable device designed to be removably placed on the end of a pole vaulting pole to permit pole vault cross bars to be replaced without the need of a separate replacing device. The device is comprised of a cylindrical body having a bottom portion defining a pole receiving cavity and a top V-shaped portion for engaging a pole vault cross bar.

11 Claims, 4 Drawing Figures

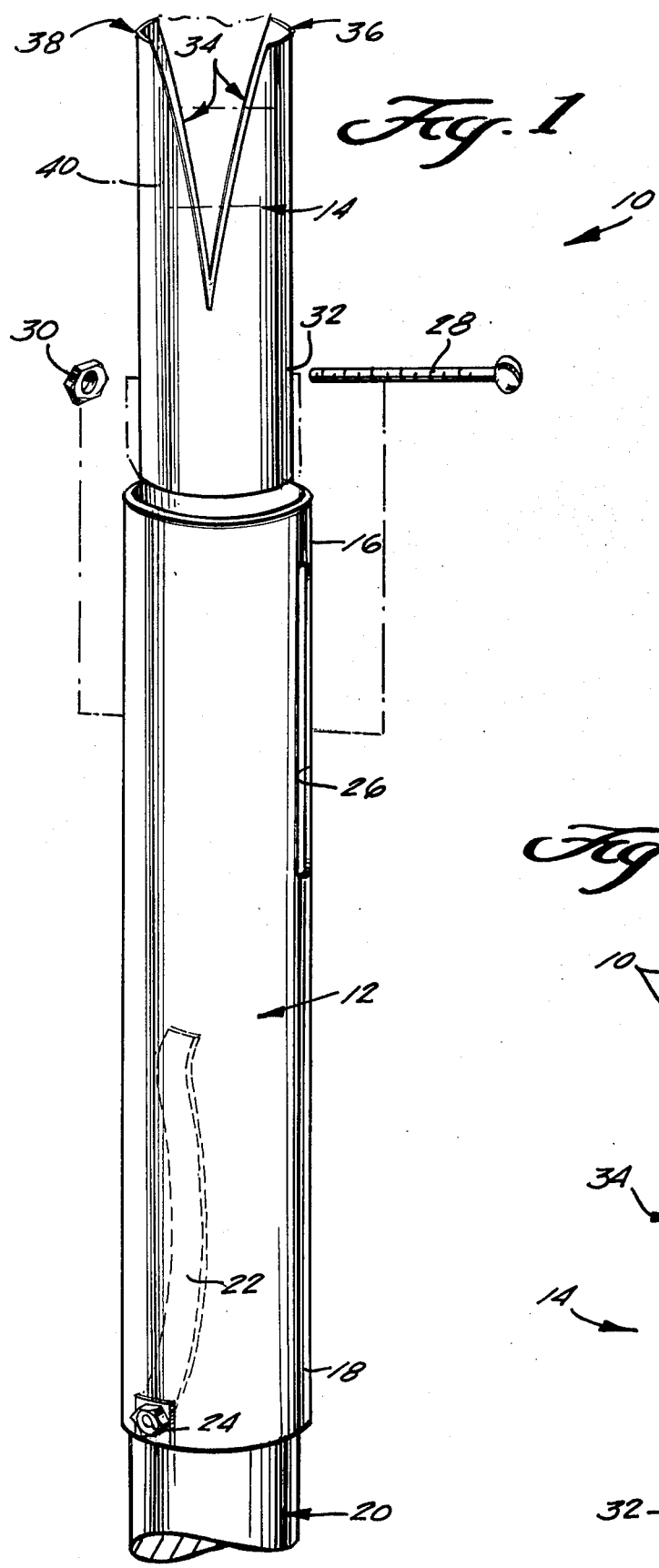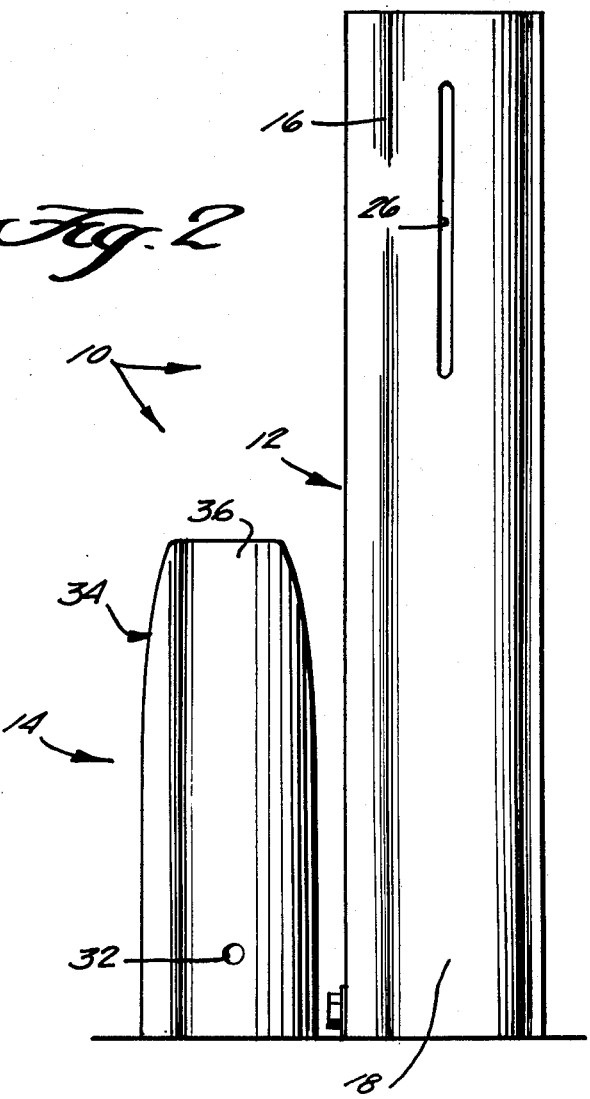
Fig. 1
Fig. 2

HI-JACK

FIELD OF THE INVENTION

This invention relates to a device for handling and repositioning pole vault cross bars.

BACKGROUND OF THE PRESENT INVENTION

It is certainly well known that pole vaulting has been a standard track and field event for many years. Competitors, using a flexible pole and with the pole in hand, run along a track of a predescribed length and width. At the end of the track the pole is planted in a plant box adjacent two vertical uprights and the forward momentum of the vaulter bends the flexible pole which lifts the vaulter allowing him to vault over a cross bar stretched between the two vertical uprights. Of course, the object is to vault over the cross bar without touching or knocking that cross bar off, but having done so the cross bar must be replaced on cross bar supports which extend from the uprights at predefined levels. Over the years as the vaulting heights have increased to the point that they are now 18' to 19', it of course becomes necessary at times to replace the cross bar at substantial heights.

Patents that I am aware of that describe the uprights used in pole vaulting comprise Medart, U.S. Pat. No. 468,625; Langton, U.S. Pat. No. 3,222,064; and Moore, U.S. Pat. No. 3,395,917.

During meets, it is often the case that a high lift type of device is used to lift a person with the cross bar in hand to the appropriate level so the cross bar can be placed back into position on each of the cross bar supports on the two vertical uprights by hand. Thereafter, the person is lowered out of the way and competition can continue. While this method of replacing cross bars is very precise and perhaps preferred during meets, it is not appropriate or economical to use this relatively complicated lifting equipment during practices, and certainly not during the practice of individual competitors which might occur at a wide variety of times throughout any given day or by vaulters practicing alone.

Accordingly, a more informal approach at replacing cross bars at practice sessions is to place one end of the cross bar on a cross bar supports on one of the poles and to thereafter place the still free and yet unsupported end of the cross bar in some device so that it can be raised toward the other cross bar support for that end and then manuevered into place. Cross bars are generally 12' to 18' long, depending upon the width between the uprights, so that one end can easily be placed on one of the cross bar supports by almost any individual jumper or vaulter. The types of devices that have been used, however, have ranged from forming U-shaped or fork like devices from pieces of wood taped to the end of an old pole or by employing broken pieces of cross bars so that the free end could be somehow cradled while being raised vertically.

One recent cross bar handling device is described in Frykholm, U.S. Pat. No. 4,089,553, in which a T-shaped member is secured to a handle. The horizontal portion of the T is formed in the nature of a U-shaped channel. By positioning the T portion at the center of the cross bar, the whole cross bar could be cradled and balanced so that the cross bar could be lifted in a horizontal position with each end being placed on each of the cross bar supports on the uprights almost simultaneously. This device also includes a clamp for more securely holding the cross bar in place during lifting and can be used with both circular and triangular cross-sectioned cross bars.

I am also aware that there are a number of other types of fork or pole lifting devices useful for a wide variety of purposes, such as a laundry fork, described in U.S. Pat. No. 728,938; a curtain pull lifter, U.S. Pat. No. 1,334,649; a tobacco stick handler in U.S. Pat. No. 1,830,690; a boat pole in U.S. Pat. No. 4,121,531 and a bow ram in U.S. Pat. No. 4,258,447. While these devices show either a U-shaped sort of arrangement or apparatus for moving a stick or pole, none of them suggest the same sort of portable type of device as is presently disclosed in this application nor a device that can be removably attached to the pole the vaulter is using to jump with only when needed to replace the cross bar.

SUMMARY OF THE PRESENT INVENTION

The present invention refers to a portable device that can be placed momentarily on the end of the pole vaulter's pole to allow that vaulter to replace a cross bar on the standards provided to support it when practicing vaulting.

The device is comprised of an outer cylinder made out of a lightweight metal or plastic material. One end is designed to receive an end of the vaulting pole and is provided with an internally mounted spring that will act against the pole when inserted therein to help maintain the device on the end of the pole in a fairly secure fashion.

Slidably secured in the other end is a smaller diameter cylinder from which two diametrically opposed V-shaped sections have been removed so as to produce two diametrically opposed and spaced apart tongues. When it is desired to use the device, it is placed on the end of the pole, and a bolt or other convenient securing or locking device which can lock the relative position of the two members is loosened. The inner cylinder is raised upwardly and is again secured in place when in its fully extended position. This will allow the two opposing tongue sections to be fully exposed beyond the end of the outer cylinder with the separation between them sufficient to permit them to fit around the cross bar or conversely for the cross bar to rest therein.

In order to replace the cross bar, one end of it can be placed on one standard and the opposite end placed between the exposed tongues on the device. That supported end of the cross bar can be raised simply by raising the pole. When the cross bar is in place, the pole is lowered and the device removed simply by sliding it from the end of the pole. Then the device can be laid on the ground next to the standard so that it will be ready when the cross bar again needs to be replaced. At the end of practicing, or at the end of jumping, the internal cylinder can be retracted into the outer cylinder and after being secured in that position, the whole device can be simply dropped into the vaulter's shoe bag or sports equipment bag where it can remain ready for use at the next practice.

Other objects, features, and characteristics of the present invention, as well as the methods and operation and functions of the related elements of the structure, and to the combination of parts and economies of manufacture, will become more apparent upon consideration of the following detailed description and the appended claims with reference to the accompanying drawings, all of which form a part of this specification, wherein like reference numerals designate corresponding parts in the various figures.

BRIEF DESCRIPTION OF THE DRAWINGS

The preferred exemplary embodiment can be understood with reference to the drawings in which:

FIG. 1 is an exploded diagrammatic perspective view of the device adjacent the end of a vaulting pole;

FIG. 2 is front, elevational view of the device shown in FIG. 1;

DETAILED DESCRIPTION OF THE PREFERRED EXEMPLARY EMBODIMENT OF THE PRESENT INVENTION

Figure 3:
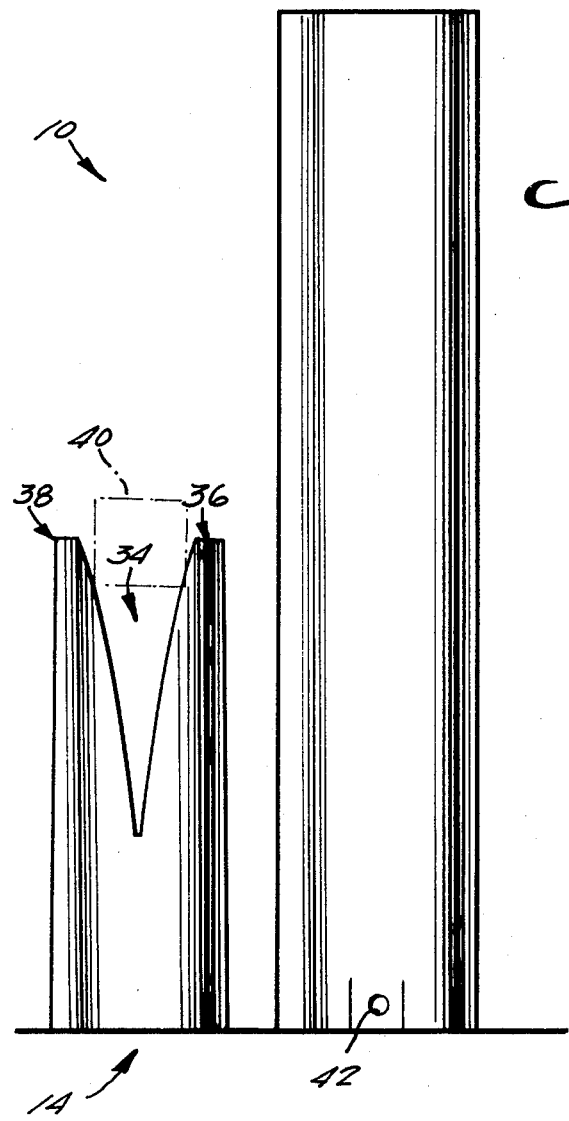
FIG. 3 is a side, elevational view of the device shown in FIGS. 1 and 2.

Turning now to FIGS. 1-3, the jack device according to the preferred embodiment of the present invention is generally indicated at 10 and is comprised of an outer housing 12 preferably in the form of a hollow cylinder, although other cross-sectional shapes could be used, and an internal member, generally indicated at 14. As can be noted in FIG. 1, internal member 14 lies at one end 16 of housing 12 whereas the other end 18 of housing 12 has and internal diameter sufficient to receive the end of a pole vaulter's pole indicated at 20. In order to help assure a secure fit about pole 20 while also permitting easy insertion and removability of pole 20, a relatively wide leaf spring 22 is secured to housing 12 adjacent end 18, as for example, by a screw 24 with the majority of spring 22 lying within the interior of the chamber defined within housing 12 at that lower end 18. Thus, as pole 20 is inserted into the chamber at end 18 of housing 12, spring 22 will be depressed and produces a snug fit between housing 12 and pole 20.

End 16 of housing 12 is provided with a pair of diametrically opposed slots 26 which are approximately centered in the upper half of housing 12. A bolt 28 extends through slots 26 from one side of housing 12 to the other and likewise extends through internal member 14 by passing through a through hole 32 and together with nut 30, bolt 28 becomes a locking or securing mechanism for securing member 14 in any desired position within the confines of slots 26.

Internal member 14 also preferably has a circular cross-section and its outer diameter is, of course, smaller than the internal diameter of housing 12 so that member 14 can slide within housing 12.

Internal member 14 can be formed either as a solid or as a smaller, hollow cylinder. In either event, the lower portion includes through hole 32 as indicated in FIGS. 2 and 3 while its upper end is formed with a V-shaped opening 34 so as to produce two upstanding legs 36 and 38, which as shown in FIG. 1, will serve to engage cross bar indicated in phantom at 40. As shown in FIG. 3, screw 24 which secures spring 22 to housing 12 extends through a hole 42 provided in the side wall of housing 12.

As exemplary of such a device, housing 12 can be approximately 9" in length (22.86 cm), about 2" in outer diameter (5 cm), with an internal diameter of about 1⅞" (4.7 cm) with the side wall thickness of housing 12 being about 1/16" (0.15 cm). Slots 26 are approximately 3" (7.6 cm) in length and are spaced about ¾" (1.9 cm) from the end of housing 12.

Inner member 14 can vary from about 4½–5" in length (11.4–12.7 cm) and can have a diameter varying from about 1⅝" to 1¾" (4.13–4.45 cm) The opening adjacent upstanding legs 36 and 38 is approximately 1⅛" (2.97 cm) wide at their tips with the opening extending rearwardly about 2½" (6.35 cm).

Figure 4:
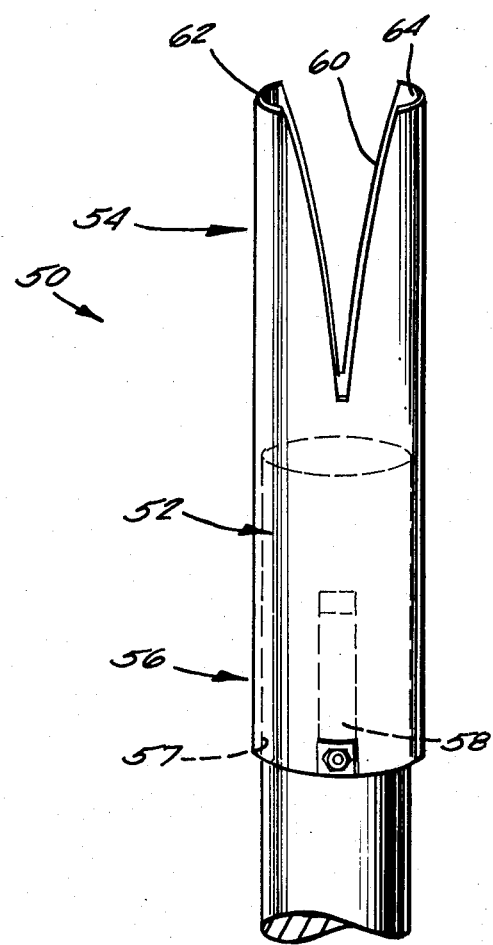
FIG. 4 is a diagrammatical perspective of another embodiment of the present invention.

Turning now to FIG. 4, a modified one piece device is generally indicated at 50 and is preferably comprised of a member 52 having an upper end 54 and a lower end 56. A pole receiving chamber 57 is located in lower end 56 and a spring 58 is suitably connected to member 52 by any convenient means with spring 58 being similar to spring 22 in the embodiment shown in FIG. 1 as it also extends within pole receiving chamber 57.

The upper end 54 is provided with a V-shaped opening, generally indicated at 60, which accordingly produces upstanding members 62 and 64 which like members 36 and 38 serve to cradle and support an end of a cross bar. Member 52 can be suitably constructed from injection or other conventional types of molding techniques, although other forming techniques could also be used. Thus, the one piece unitary structure could be formed as a hollow cylinder or alternatively, so that the upper portion 54 was formed as a solid piece with only portion 56 being hollow to define chamber 57 which receives the end of pole vaulting pole 20.

The dimensions are not critical so long as opening 60 can receive the standard cross bars and so that chamber 57 is capable of receiving a standard diameter pole vaulting pole therein.

With respect to both embodiments, suitable stops can be provided in ends 18 or 56 to limit the extent to which the pole vaulting pole can extend into the device.

Rule 173 from the IAAF handbook states as follows regarding pole vaulting:

"1. Any competitor may have the uprights moved in either direction but they may not be moved for more than 60 centimeters (2 ft.) from the prolongation of the inside edge of the top of the stopboard. If the uprights are moved, the Judges should make a re-measurement to ensure that there is no variation in the height. See also Rule 145 for measurements.

2. The take-off from the pole vault shall be from a box made of wood, metal or some other suitable material which shall be sunk level with the ground.

3. A competitor fails if he:
   (a) knocks the bar off the supports; or
   (b) leaves the ground for the purpose of making a vault and fails to clear the bar; or
   (c) after leaving the ground places his lower hand above the upper one or moves the upper hand higher on the pole; or
   (d) before taking off touches, with any part of his body or with the pole, the ground including the landing area beyond the vertical plane of the upper part of the stopboard.

4. If in making an attempt the competitor's pole is broken, it shall not be counted as a failure.

5. No one shall be allowed to touch the pole unless it is falling away from the bar or uprights. If it is touched, however, and the Referee is of the opinion that, but for the intervention, the bar would have been knocked off, the vault shall be recorded as a failure.

6. Competitors may use their own poles. No competitor shall be allowed to use any of the private poles except with the consent of the owner. See also Rules 201 and 202.

7. Competitors are permitted to use an adhesive substance such as resin or similar substance on their hands only, in order to obtain a better grip.

The use of a forearm cover to prevent injuries shall be allowed.

See also Rules 201 and 202—Vaulting Standards, box and pole."

Reference was made to Rules 201 and 202 which are as follows regarding pole vaulting:

"Rule 201

1. General (a) Uprights. Any style or kind of uprights or posts may be used, provided they are rigid.

(b) Cross-bar. The cross-bar shall be of wood, metal or other suitable material, triangular or circular in section. So as to avoid dangerously sharp edges, a triangular bar may be so formed that the edges are slightly rounded and it may be deemed to satisfy the requirement as to measurement if it passes with only a small tolerance through a triangular cut-out of the specific dimensions. Each side of the triangular bar shall measure 30 millimeters (1⅛ in.) and the diameter of the circular bar at least 25 millimeters (1 in.) but not more than 30 millimeters (1⅛ in.).

Rule 201

3. Pole Vault (b) Cross-bar. The cross-bar shall be between 3.86 meters (12 ft. 8 in.) and 4.52 meters (14 ft. 10 in.) in length. The maximum weight for the cross-bar shall be 2.26 kg (5 lb.).

Rule 202

Vaulting Pole. The pole may be of any material or combination of materials and of any length or diameter, but the basic surface of themetal, where metal is used, must be smooth. The pole may have a binding only of not more than two layers of adhesive tape of uniform thickness.

This restriction does not however apply to binding the bottom end of the pole with protective layers of tape for a distance of about 30 centimeters (1 ft.) to reduce the risk of damaging the pole when striking the back of the box."

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims, which scope is to be accorded the broadest interpretation so as to encompass all such modifications and equivalent structures.

What I claim is:

1. A portable pole vaulting cross-bar replacer comprising a substantially cylindrical body having top and bottom portions, first means located within said bottom portion for defining a pole receiving cavity for releasably receiving therein an end of a standard pole vaulting pole, said top portion being comprised of two spaced apart upstanding members defining between them a gradually closing substantially continous V-shaped cross-bar engaging opening therebetween for releasably receiving and supporting a standard pole vaulting cross-bar so that said cross-bar replacer can be slid over one end of the pole vaulting pole and one end of the cross-bar can then be rested within said V-shaped opening and raised into position with the cross-bar replacer then being removed from the cross-bar and then slid off the pole vaulting pole.

2. A pole vaulting cross-bar replacing device for use with a pole vaulting pole comprising first and second members, said first member comprising a hollow cylinder formed with means defining a recess opening to the exterior of the device for removably receiving one end of a standard pole vault pole therein, said second member being a second hollow cylinder, said first and second hollow cylinders being slidably secured together so that one can be received within the other, and means for adjustably fixing the relative position between the first and second members, said second member including means defining an opening extending along opposite sides of said second hollow cylinder for removably receiving a standard pole vaulting cross-bar therein.

3. A replacing device as in claim 2 wherein said second member has an outer diameter smaller than the inner diameter of said first member so that said second member can be movably positioned within said first member.

4. A replacing device as in claim 2, wherein said lower pole receiving portion includes biasing means for frictionally securing an end of said standard pole vaulting pole therein.

5. A replacing device as in claim 2, wherein said first and second members are comprised of a plastic material.

6. A replacing device as in claim 2, wherein said first and second members are comprised of metal.

7. A cross bar replacer as in claim 1, wherein said replacer is comprised of a one piece structure.

8. In combination a standard pole vaulting pole and a removable short length tubular shaped cross-bar replacing attachment therefor, said cross-bar replacing attachment having an upper and lower portion, said lower portion including means defining a recess for releasably receiving one end of said standard pole vaulting pole, said upper portion being provided with spaced apart means formed from predetermined arcuate portions of said tubular shape defining an outwardly accessible opening arranged to releasably receive a standard pole vaulting cross-bar therein.

9. The combination as in claim 8, wherein said cross-bar replacing attachment is comprised of a one piece member.

10. The combination as in claim 8, wherein said attachment is comprised of first and second members arranged to be mutually, reciprocally movable one to the other between extended and unextended positions, means to adjustably fix the relative positions of said first and second members.

11. A portable pole vaulting cross-bar replacing device for use with a standard pole vault pole to reset a fallen standard sized cross-bar on jumping standards, said cross-bar replacing device comprising a one piece, unitary, cylindrical member having top and bottom ends, means at the bottom end defining a hollow inwardly extending opening having a minimum diameter of about 4–7 cm, said hollow interior releasably receiving one end of a standard pole vault pole, said top end being defined by two spaced apart members defining an opening therebetween having a dimension between the members adjacent their ends of about 2.97 cm, so that the bottom end of said cylindrical member can momentarily be placed over one end of said standard pole vault pole and a standard cross-bar can be received within the opening at said top end and raised into a desired position.

* * * * *